(12) United States Patent
Tazume et al.

(10) Patent No.: US 11,370,608 B2
(45) Date of Patent: Jun. 28, 2022

(54) PACKAGE RECEIVING AND HOLDING APPARATUS AND PACKAGE RECEIVING AND HOLDING METHOD

(71) Applicant: RAKUTEN GROUP, INC., Tokyo (JP)

(72) Inventors: Toshiaki Tazume, Tokyo (JP); Qingnan Zhou, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 16/645,796

(22) PCT Filed: Dec. 26, 2018

(86) PCT No.: PCT/JP2018/047773
§ 371 (c)(1),
(2) Date: Mar. 10, 2020

(87) PCT Pub. No.: WO2020/136742
PCT Pub. Date: Jul. 2, 2020

(65) Prior Publication Data
US 2021/0214159 A1    Jul. 15, 2021

(51) Int. Cl.
  *B65G 1/04*     (2006.01)
  *A47G 29/14*    (2006.01)
  *B64F 1/32*     (2006.01)

(52) U.S. Cl.
  CPC ......... *B65G 1/0435* (2013.01); *A47G 29/141* (2013.01); *B64F 1/32* (2013.01); *B65G 1/0485* (2013.01)

(58) Field of Classification Search
  CPC .. B65G 1/0435; B65G 1/0485; B65G 1/1378; B65G 65/00; B65G 69/24; A47G 29/141
  See application file for complete search history.

(56) References Cited

U.S. PATENT DOCUMENTS

| 2017/0039510 A1 | 2/2017 | Ogilvie et al. |
| 2017/0178071 A1 | 6/2017 | Ogilvie et al. |

(Continued)

FOREIGN PATENT DOCUMENTS

| CN | 106552771 A | 4/2017 |
| CN | 107720069 A | 2/2018 |

(Continued)

OTHER PUBLICATIONS

Translation of CN 207 645 127 (Year: 2018).*

(Continued)

*Primary Examiner* — Kaitlin S Joerger
(74) *Attorney, Agent, or Firm* — HEA Law PLLC

(57) ABSTRACT

Provided is a package receiving and holding apparatus including: a stage for unloading a package transported by an unmanned aerial vehicle; a storage repository, which is arranged adjacent to the stage, and includes a plurality of storage spaces arranged at least in a vertical direction, in order to store the package; a lifter for raising and lowering the stage; a pusher, which is movable in a manner so as to push the package on the stage; and an actuator for moving the pusher. The lifter is controlled so as to lower the stage from an unloading position of the package to a storage position corresponding to a selected one of the plurality of storage spaces. The actuator is controlled so as to move the pusher horizontally in order to slide and move the package toward the selected one of the plurality of storage spaces.

32 Claims, 14 Drawing Sheets

(56) References Cited

U.S. PATENT DOCUMENTS

| | | | |
|---|---|---|---|
| 2017/0295980 A1* | 10/2017 | Willcox | A47G 29/141 |
| 2018/0101820 A1* | 4/2018 | Peynet | G06Q 10/08 |
| 2018/0105289 A1* | 4/2018 | Walsh | B60L 53/51 |
| 2019/0343317 A1* | 11/2019 | Cantrell | A47G 29/1248 |
| 2020/0022520 A1* | 1/2020 | Friedli | E05B 65/52 |
| 2020/0172337 A1* | 6/2020 | Wilkinson | G07F 11/62 |
| 2020/0193375 A1* | 6/2020 | Santangeli | H04L 63/101 |
| 2020/0226539 A1* | 7/2020 | Durkee | B65G 43/08 |
| 2020/0327687 A1* | 10/2020 | Kadowaki | G01B 11/00 |

FOREIGN PATENT DOCUMENTS

| | | | |
|---|---|---|---|
| CN | 207645127 U | * | 7/2018 |
| CN | 207645127 U | | 7/2018 |
| JP | S58-30608 U | | 2/1983 |
| JP | 2007-76919 A | | 3/2007 |
| JP | 2017-517466 A | | 6/2017 |
| JP | 6201092 B1 | | 9/2017 |

OTHER PUBLICATIONS

Office Action dated Nov. 5, 2019, for corresponding JP Application No. 2019-540135 and partial translation of the Office Action.
Search Report dated Apr. 9, 2021, for corresponding EP Patent Application No. 18932971.7 pp. 1-9.
Office Action dated Jun. 29, 2021, for corresponding CN Patent Application No. 201880063274.1 with partial English translation pp. 1-19.

* cited by examiner

PACKAGE RECEIVING AND HOLDING APPARATUS AND PACKAGE RECEIVING AND HOLDING METHOD

CROSS REFERENCE TO RELATED APPLICATIONS

This application is a National Stage of International Application No. PCT/JP2018/047773 filed on Dec. 26, 2018. The contents of the above document is incorporated herein by reference in its entirety.

TECHNICAL FIELD

The present invention relates to a package receiving and holding apparatus and a package receiving and holding method.

BACKGROUND ART

In recent years, facilities referred to as, for example, "delivery box" or "delivery locker", which enable a receiving person to receive a package even when the receiving person is absent, have been spreading. In addition to being installed in apartment buildings, delivery boxes are also installed in public spaces, for example, railway stations, and may be used by many unspecified number of users. Recently, unmanned delivery using a drone (unmanned aerial vehicle) has been studied.

CITATION LIST

Patent Literature

[Patent Literature 1] JP 6201092 B1
[Patent Literature 2] JP 2017-517466 A

SUMMARY OF INVENTION

Technical Problem

The related art may be inefficient, or require a complex mechanism, for receiving a plurality of packages by a plurality of drones and holding a plurality of packages for a plurality of receiving people.

It is an object of the present invention to enable a plurality of packages to be received and held by a simple mechanism.

Solution to Problem (1) According to one embodiment of the present invention, there is provided a package receiving and holding apparatus including: a stage for unloading a package transported by an unmanned aerial vehicle; a storage repository, which is arranged adjacent to the stage, and includes a plurality of storage spaces arranged at least in a vertical direction; a lifter for raising and lowering the stage; a pusher, which is movable in a manner so as to push the package on the stage; and an actuator for moving the pusher, the lifter being controlled so as to lower the stage from an unloading position of the package to a storage position corresponding to a selected one of the plurality of storage spaces, the actuator being controlled so as to move the pusher horizontally in order to slide and move the package toward the selected one of the plurality of storage spaces.

According to the present invention, the package can be held in a selected one of the plurality of storage spaces by a simple structure including the stage to be used in both unloading and slide movement of the package and the pusher to be moved horizontally.

(2) In the package receiving and holding apparatus according to Item (1), the stage may have a size that allows the unmanned aerial vehicle to take off and land.

(3) In the package receiving and holding apparatus according to Item (1) or (2), the storage repository may be arranged at a periphery of the stage.

(4) In the package receiving and holding apparatus according to Item (3), the storage repository may be arranged so as to surround the stage in a continuous manner.

(5) In the package receiving and holding apparatus according to Item (3) or (4), each of the plurality of storage spaces may include: a carry-in port configured to be adjacent to an outer edge of the stage; and a take-out port on an opposite side to the carry-in port.

(6) In the package receiving and holding apparatus according to Item (5), each of the plurality of storage spaces may be physically separated from an adjacent storage space, and the take-out port may be lockable and unlockable.

(7) In the package receiving and holding apparatus according to Item (6), the take-out port may be controlled so as to be locked when the package is stored.

(8) In the package receiving and holding apparatus according to Item (6) or (7), the take-out port may include a door that is openable and closable.

(9) In the package receiving and holding apparatus according to any one of Items (1) to (8), the stage may include a conveying surface for unloading and slide-moving the package, each of the plurality of storage spaces may include a holding surface for holding the package, the lifter may be controlled such that when the package is slid and moved, the conveying surface is at a higher position than the holding surface, and at least one of the storage repository and the stage may include an inclined surface descending in a direction from the conveying surface to the holding surface between the conveying surface and the holding surface.

(10) In the package receiving and holding apparatus according to any one of Items (1) to (9), the pusher may include: a first bar extending along a first direction such that the package hits a side surface; and a second bar extending along a second direction intersecting the first direction such that the package hits a side surface, and the actuator may include: a first slider configured to retain the first bar to be movable in a direction intersecting the first direction; and a second slider configured to retain the second bar to be movable in a direction intersecting the second direction.

(11) In the package receiving and holding apparatus according to Item (10), the first slider may be movable along the second direction, and the second slider may be movable along the first direction.

(12) In the package receiving and holding apparatus according to Item (10) or (11), the actuator may include: a first motor for moving the first slider; and a second motor for moving the second slider.

(13) In the package receiving and holding apparatus according to any one of Items (10) to (12), the pusher may include: a third bar extending along the first direction such that the package hits a side surface; and a fourth bar extending along the second direction such that the package hits a side surface, and the actuator may include: a third slider configured to retain the third bar to be movable in a direction intersecting the first direction; and a fourth slider configured to retain the fourth bar to be movable in a direction intersecting the second direction.

(14) In the package receiving and holding apparatus according to Item (13), the third slider may be movable along the second direction, and the fourth slider may be movable along the first direction.

(15) In the package receiving and holding apparatus according to Item (13) or (14), the actuator may include: a third motor for moving the third slider; and a fourth motor for moving the fourth slider.

(16) In the package receiving and holding apparatus according to any one of Items (13) to (15), the actuator may be controlled such that during unloading of the package, the first bar and the third bar are positioned on opposite sides to each other at an outer side of the conveying surface and the second bar and the fourth bar are positioned on opposite sides to each other at an outer side of the conveying surface.

(17) In the package receiving and holding apparatus according to Item (16), the actuator may be controlled such that, before unloading of the package, the first bar and the third bar are moved to the outer side of the conveying surface and the second bar and the fourth bar are moved to the outer side of the conveying surface.

(18) In the package receiving and holding apparatus according to Item (17), one of the first bar and the third bar and one of the second bar and the fourth bar may be used to push the package, and at least one of remaining bars other than the one of the first bar and the third bar and the one of the second bar and the fourth bar that are used to push the package may be used as a guide for sliding and moving the package.

(19) In the package receiving and holding apparatus according to any one of Items (1) to (18), the lifter may be controlled such that the stage is at the unloading position during unloading of the package.

(20) In the package receiving and holding apparatus according to Item (19), the lifter may be controlled so as to raise the stage at the storage position to the unloading position before unloading of the package.

(21) In the package receiving and holding apparatus according to Item (20), the lifter may be controlled so as to raise the stage to the unloading position when the unmanned aerial vehicle approaches.

(22) In the package receiving and holding apparatus according to any one of Items (1) to (21), the actuator may be controlled so as to start the slide movement of the package after unloading of the package is complete.

(23) In the package receiving and holding apparatus according to Item (22), the unmanned aerial vehicle may be controlled so as to land on the stage and to take off after unloading of the package is complete, and the actuator may be controlled so as to start the slide movement of the package after the unmanned aerial vehicle takes off.

(24) The package receiving and holding apparatus according to any one of Items (1) to (23) may further include a processor configured to control driving of the lifter and the actuator.

(25) In the package receiving and holding apparatus according to Item (24), the processor may be configured to select the one of the plurality of storage spaces based on information on which of the plurality of storage spaces is available.

(26) In the package receiving and holding apparatus according to Item (24) or (25), the plurality of storage spaces may include storage spaces having different sizes, and the processor may be configured to select the one of the plurality of storage spaces based on information on the size of each of the plurality of storage spaces.

(27) According to one embodiment of the present invention, there is provided a method of receiving and holding a package, the method including the steps of: unloading a package transported by an unmanned aerial vehicle onto a stage; controlling a lifter configured to raise and lower the stage such that the stage is lowered from an unloading position of the package to a storage position corresponding to a selected one of a plurality of storage spaces arranged adjacent to the stage at least in a vertical direction; and controlling an actuator configured to move a pusher such that the package is pushed and slid and moved on the stage by a horizontal movement of the pusher toward the selected one of the plurality of storage spaces.

According to the present invention, the stage is used in both unloading and slide movement of the package, and the package can be held in a selected one of a plurality of storage spaces by horizontally moving the pusher. Therefore, a plurality of packages can be received and held by a simple mechanism.

(28) In the method of receiving and holding a package according to Item (27), each of the plurality of storage spaces may include: a carry-in port adjacent to an outer edge of the stage; and a take-out port on an opposite side to the carry-in port, and the method may further include a step of controlling the take-out port such that the take-out port is locked when the package is stored.

(29) The method of receiving and holding a package according to Item (27) or (28) may further include a step of controlling the lifter such that the lifter raises the stage at the storage position to the unloading position before the unloading of the package.

(30) The method of receiving and holding a package according to Item (29) may further include a step of controlling the lifter such that the lifter raises the stage to the unloading position when the unmanned aerial vehicle approaches.

(31) The method of receiving and holding a package according to any one of Items (27) to (30) may further include a step of controlling the actuator such that the actuator starts the slide movement of the package after the unloading of the package is complete.

(32) In the method of receiving and holding a package according to any one of Items (27) to (31), the unmanned aerial vehicle may be controlled so as to land on the stage and to take off after the unloading of the package is complete, and the method may further include a step of controlling the actuator such that the actuator starts the slide movement of the package after the unmanned aerial vehicle takes off.

DESCRIPTION OF EMBODIMENTS

Now, an embodiment of the present invention is described with reference to the drawings. The present invention can be implemented by various modes without departing from the gist of the present invention, and is not to be construed as being limited to the descriptions of the exemplary embodiment described below.

Figure 1:
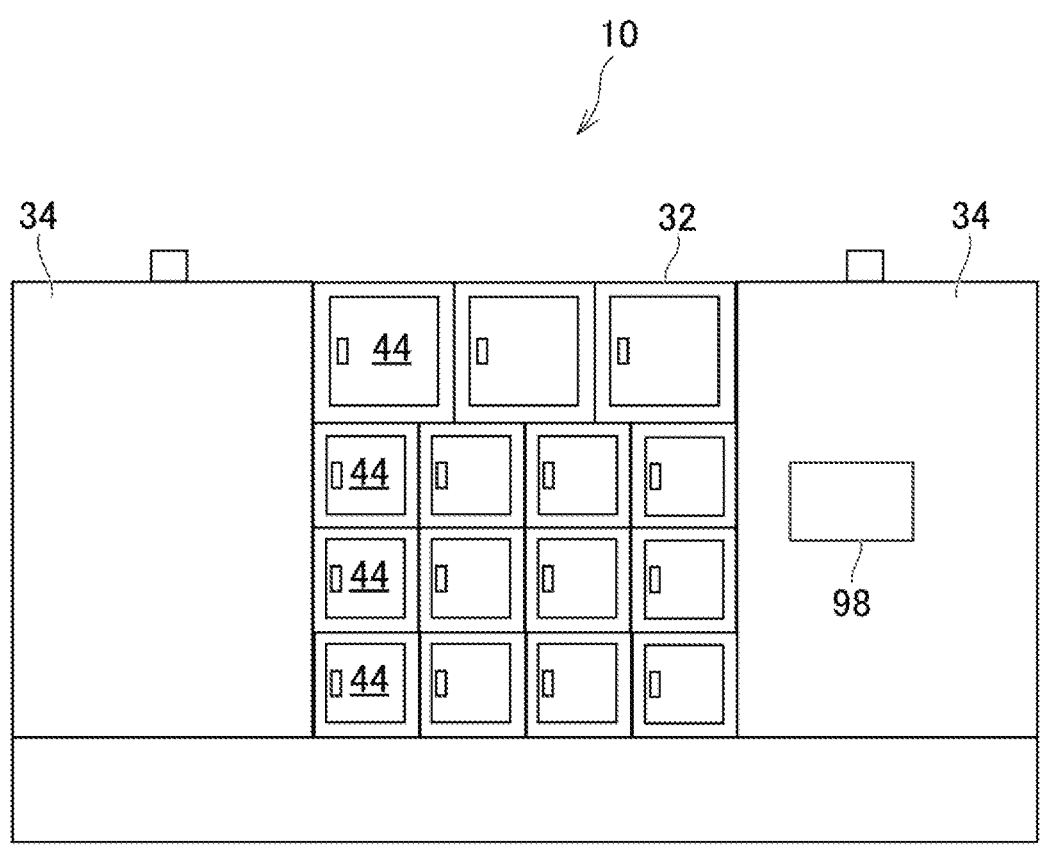
FIG. 1 is a side view of a package receiving and holding apparatus according to an embodiment of the present invention.
Figure 2:
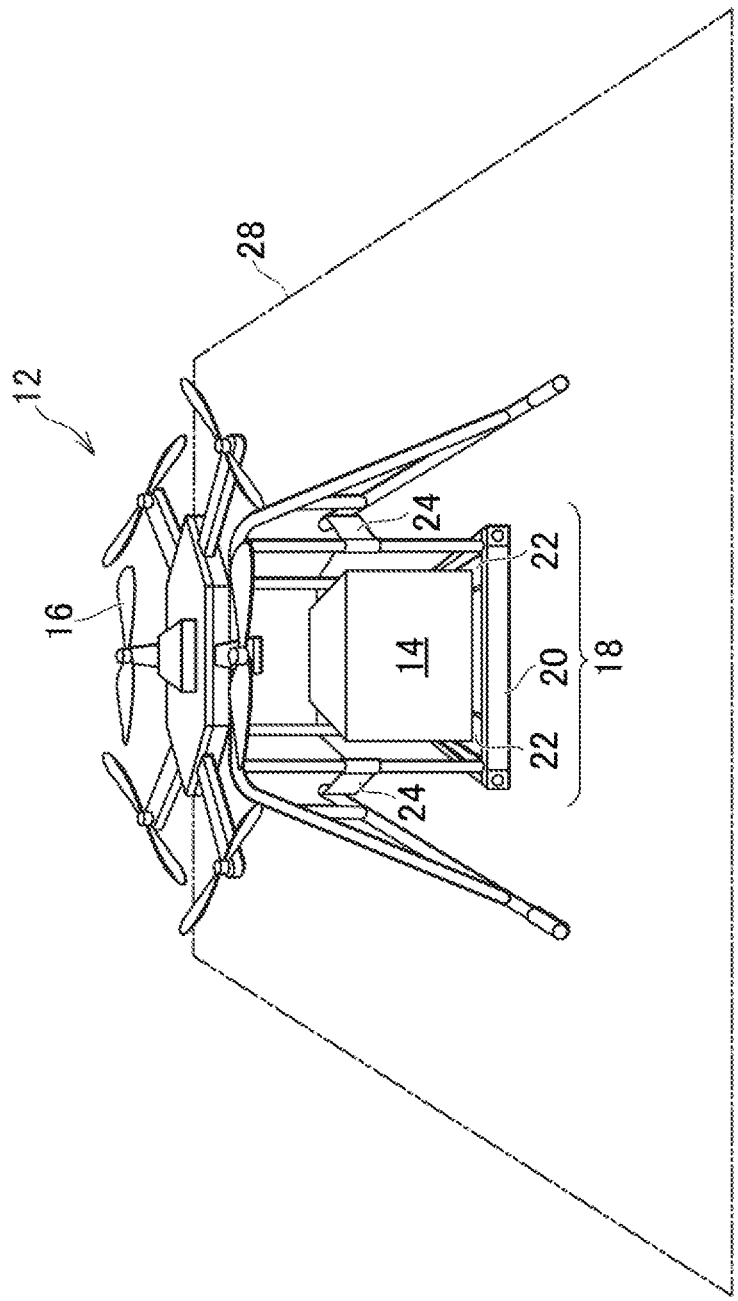
FIG. 2 is a perspective view of an unmanned aerial vehicle for transporting a package.

FIG. 1 is a side view of a package receiving and holding apparatus according to the embodiment of the present invention. FIG. 2 is a perspective view of an unmanned aerial vehicle for transporting a package. A package receiving and holding apparatus 10 is configured to hold a package 14 transported by an unmanned aerial vehicle 12.

[Unmanned Aerial Vehicle 12]

The unmanned aerial vehicle 12 is an aircraft on which a person does not board, and may be, for example, a drone configured to be driven by a battery or by an engine. The unmanned aerial vehicle 12 includes a motor and a battery for rotating a propeller 16, and includes a control unit, a storage unit, a communication unit, and a sensor unit (which are not shown).

The unmanned aerial vehicle 12 includes a package housing unit 18. The package storage unit 18 includes a frame 20 having a space for housing the package 14. The frame 20 has a size sufficient for the package 14 to be placed and fixed therein. The package housing unit 18 includes arms 22 configured to support the package 14 such that the package 14 does not fall out during delivery, and a stopper 24 having a known locking mechanism. The package 14 is placed on the arms 22 and is fixed so that the package 14 does not to move in a horizontal direction by closing the stopper 24. The arms 22 are openable and closable by the rotation of a motor (not shown). When the unmanned aerial vehicle 12 lands, the arms 22 open downward, and the package 14 placed on the arms 22 falls down a few centimeters.

Figure 3:
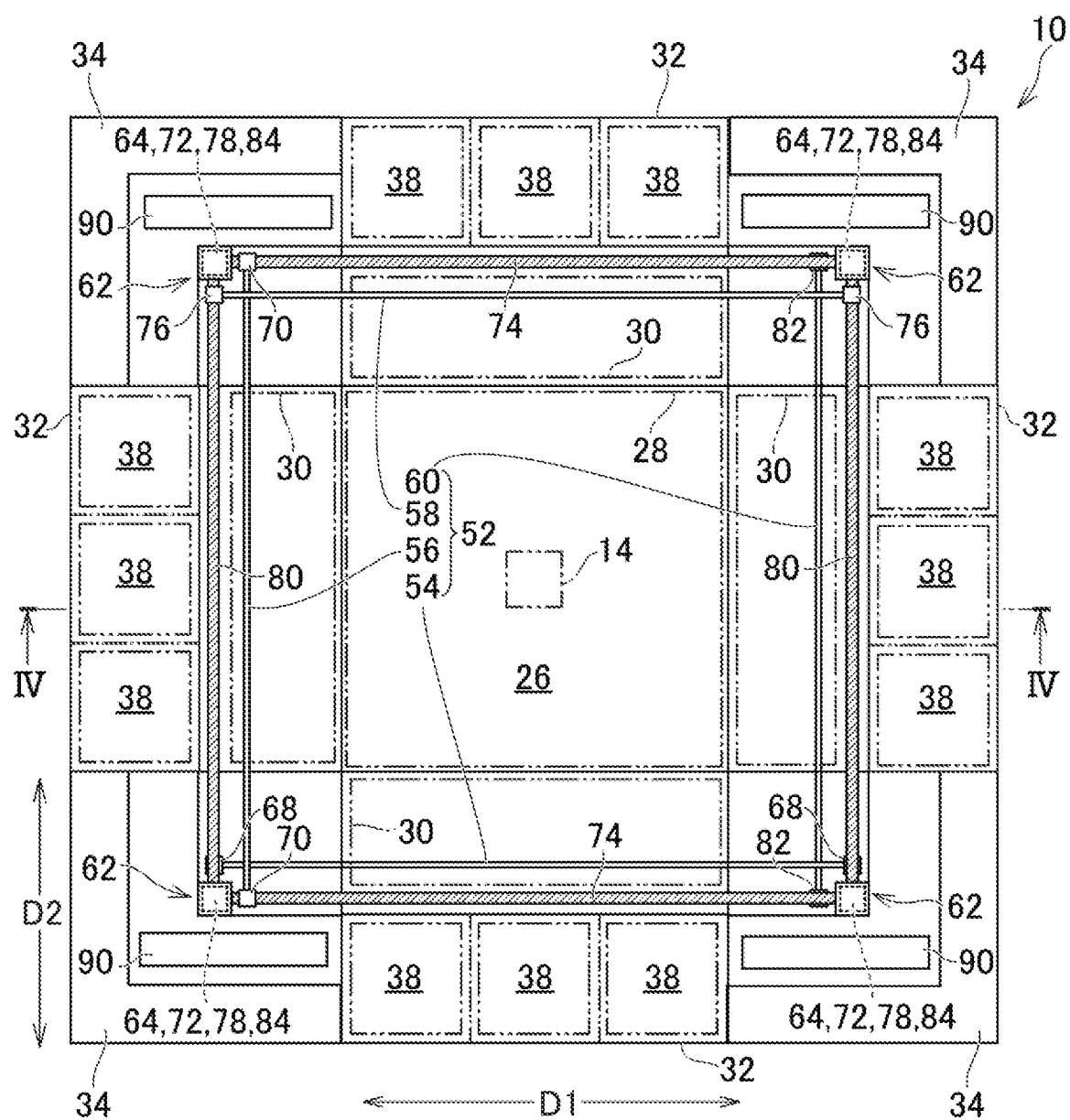
FIG. 3 is a plan view of the package receiving and holding apparatus illustrated in FIG. 1.
Figure 4:
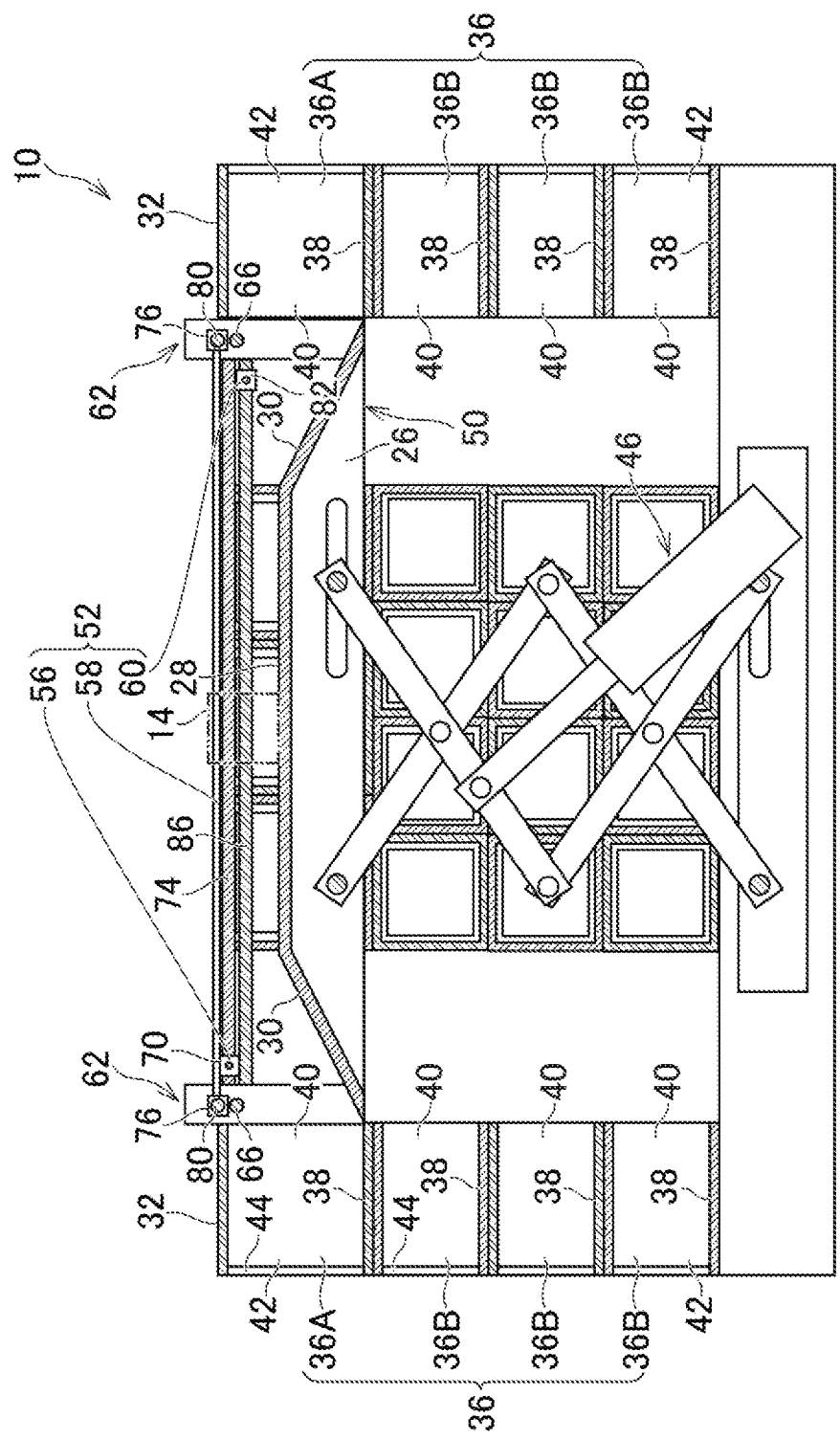
FIG. 4 is a cross-sectional view taken along the line IV-IV of the package receiving and holding apparatus illustrated in FIG. 1.

FIG. 3 is a plan view of the package receiving and holding apparatus 10 illustrated in FIG. 1. FIG. 4 is a cross-sectional view taken along the line IV-IV of the package receiving and holding apparatus 10 illustrated in FIG. 1.

[Stage]

The package receiving and holding apparatus 10 includes a stage 26 for unloading the package 14 from the unmanned aerial vehicle 12. The stage 26 includes a conveying surface 28 for unloading of the package 14. The conveying surface 28 is also for slide movement of the package 14. The stage 26 has an inclined surface 30 extending in a downward direction to an outer side of the conveying surface 28. The unmanned aerial vehicle 12 is controlled so as to land on the stage 26 and to take off after the unloading of the package 14 is complete. The stage 26 has a size that allows the unmanned aerial vehicle 12 to take off and land.

[Storage Repository]

The package receiving and holding apparatus 10 includes a storage repository 32 for storing the package 14. The storage repository 32 is arranged adjacent to the stage 26. The storage repository 32 is arranged at a periphery of the stage 26. The storage repository 32 is arranged so as to surround the stage 26 in a continuous manner to prevent human intrusion. The storage repository 32 includes a wall 34 as required.

The storage repository 32 includes a plurality of storage spaces 36. Each of the plurality of storage spaces 36 is physically separated from an adjacent storage space. Each of the plurality of storage spaces 36 includes storage spaces 36A and 36B having different sizes. The plurality of storage spaces 36 are arranged in a vertical direction and also arranged in a horizontal direction.

Each of the plurality of storage spaces 36 has a holding surface 38 for holding the package 14. The holding surface 38 is adjacent to the inclined surface 30 of the stage 26. The inclined surface 30 descending in a direction from the conveying surface 28 to the holding surface 38 is arranged between the conveying surface 28 and the holding surface 38. As a modification example, the inclined surface may be arranged in the storage repository 32.

Each storage space 36 includes a carry-in port 40 configured to be adjacent to the outer edge of the stage 26. Each storage space 36 includes a take-out port 42 on an opposite side to the carry-in port 40. The take-out port 42 includes a door 44 that is openable and closable. The take-out port 42 is lockable and unlockable. The take-out port 42 is controlled to be locked when the package 14 is stored.

[Lifter]

The package receiving and holding apparatus 10 includes a lifter 46 for raising and lowering the stage 26. The lifter 46 is a known raising and lowering device that uses hydraulic pressure. The lifter 46 is configured to lower the stage 26 from an unloading position 48 (see FIG. 9) of the package 14 to a storage position 50 (see FIG. 4) corresponding to a selected one of the plurality of storage spaces 36.

When the stage 26 is at a storage position 50, the conveying surface 28 is at a higher position than the holding surface 38, but the conveying surface 28 and the holding surface 38 are connected by the inclined surface 30. As a result, slide movement of the package 14 from the conveying surface 28 to the holding surface 38 becomes possible, and the package 14 can be stored in the storage space 36.

[Pusher]

The package receiving and holding apparatus 10 includes a pusher 52 (jig for pushing), which is movable so as to push the package 14 on the stage 26. The pusher 52 includes a first bar 54 extending along a first direction D1 such that the package 14 hits a side surface. The pusher 52 includes a second bar 56 extending along a second direction D2 intersecting (e.g., orthogonal to) the first direction D1 such that the package 14 hits a side surface. The pusher 52 includes a third bar 58 extending along the first direction D1 such that the package 14 hits a side surface. The pusher 52 includes a fourth bar 60 extending along the second direction D2 such that the package 14 hits a side surface.

The package 14 pushed by the pusher 52 slides to move in a two-dimensional direction (first direction D1 and second direction D2). One of the second bar 56 and the fourth bar 60 is used to push the package 14 in the first direction D1.

One of the first bar 54 and the third bar 58 is used to push the package 14 in the second direction D2. At least one of the remaining bars that is not used to push the package 14 may be used as a guide for the slide movement of the package 14.

[Actuator]

The package receiving and holding apparatus 10 includes an actuator 62 for moving the pusher 52. The actuator 62 is configured to move the pusher 52 horizontally. As a result, the package 14 can be slid to be moved toward the selected one of the plurality of storage spaces 36.

The actuator 62 includes a mechanism for converting rotational motion into linear motion. For example, the actuator 62 includes a first motor 64. A first screw shaft 66 is coupled to a rotation shaft of the first motor 64. A first slider 68 having a screw hole is fitted to the first screw shaft 66. As a result, rotational motion of the first motor 64 is converted into linear motion, and the first slider 68 can be moved. The first slider 68 is movable in a direction intersecting the first direction D1 (e.g., second direction D2). The first slider 68 is configured to retain the first bar 54.

The actuator 62 includes a second slider 70 movable in a direction intersecting the second direction D2 (e.g., first direction D1). The second slider 70 is configured to retain the second bar 56. The actuator 62 includes a second motor 72. A second screw shaft 74 is coupled to a rotation shaft of the second motor 72, and the second slider 70 having a screw hole is fitted to the second screw shaft 74. As a result, the second motor 72 moves the second slider 70.

The actuator 62 includes a third slider 76 movable in a direction intersecting the first direction D1 (e.g., second direction D2). The third slider 76 is configured to retain the third bar 58. The actuator 62 includes a third motor 78. A third screw shaft 80 is coupled to a rotation shaft of the third motor 78, and the third slider 76 having a screw hole is fitted to the third screw shaft 80. As a result, the third motor 78 moves the third slider 76.

The actuator 62 includes a fourth slider 82 movable in a direction intersecting the second direction D2 (e.g., first direction D1). The fourth slider 82 is configured to retain the fourth bar 60. The actuator 62 includes a fourth motor 84. A fourth screw shaft 86 is coupled to a rotation shaft of the fourth motor 84, and the fourth slider 82 having a screw hole is fitted to the fourth screw shaft 86. As a result, the fourth motor 84 moves the fourth slider 82.

According to this embodiment, the package 14 can be held in a selected one of the plurality of storage spaces 36 by a simple structure including the stage 26 to be used in both unloading and slide movement of the package 14 and the pusher 52 to be moved horizontally.

[Delivery System]

Figure 5:
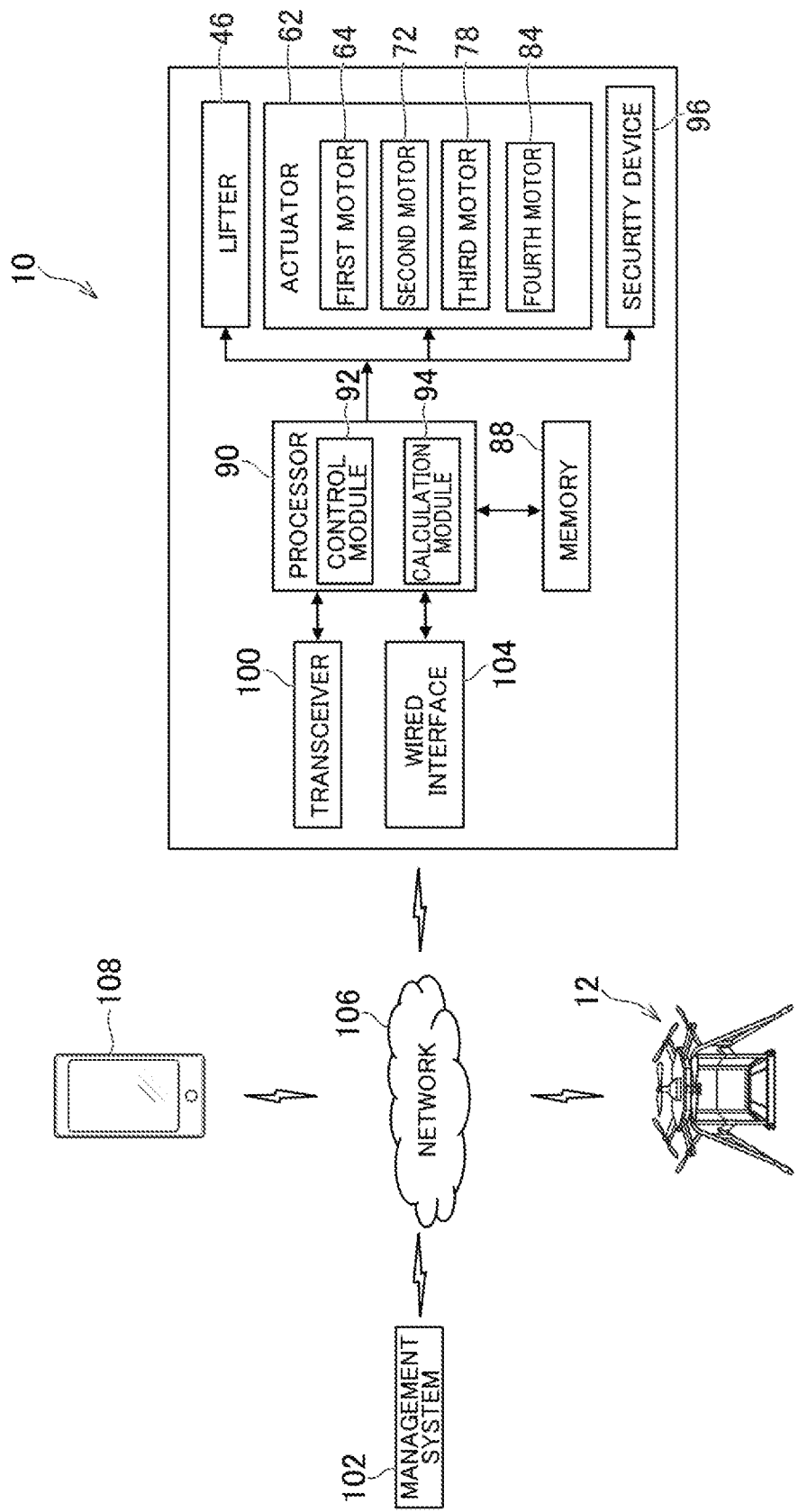
FIG. 5 is a block diagram for illustrating a delivery system including the package receiving and holding apparatus.

FIG. 5 is a block diagram for illustrating a delivery system including the package receiving and holding apparatus 10. The package receiving and holding apparatus 10 includes a memory 88. The memory 88 is configured to store, in addition to a usage status of the storage space 36, information [e.g., machine identification code (ID) and delivery schedule] on the unmanned aerial vehicle 12 and information [e.g., package identification code (ID), size, and password] on the package 14.

The package receiving and holding apparatus 10 includes a processor 90. For example, the processor 90 is arranged on an inner side of the wall 34. The processor 90 includes a control module 92 and a calculation module 94. The processor 90 (control module 92) is configured to control driving (raising and lowering) of the lifter 46. The processor 90 (control module 92) is also configured to control driving of the actuator 62 (first motor 64, second motor 72, third motor 78, and fourth motor 84). The processor 90 (control module 92) is also configured to control a security device 96. The security device 96 is configured to control the locking and unlocking of the take-out port 42 (door 44), and to control the opening and closing of the carry-in port 40 as required. The password required for unlocking the take-out port 42 (door 44) is entered on a control panel 98 (FIG. 1) mounted to the wall 34.

The package receiving and holding apparatus 10 includes a transceiver 100 for communication to and from the unmanned aerial vehicle 12. The package receiving and holding apparatus 10 includes a wired interface 104 for communication to and from a management system 102. Communication is performed via a network 106. The unmanned aerial vehicle 12 and the package receiving and holding apparatus 10 are connected to each other via the network 106 such that data can be transmitted and received to and from each other. The management system 102 for remotely operating the unmanned aerial vehicle 12 is also connected to the network 106 such that data can be transmitted and received to and from each other.

The management system 102 is an unmanned aerial vehicle 12 (UAV) air traffic control system (UTM: UAV traffic management), which performs roles such as flight route and altitude management, data management and analysis, flight permission, real-time monitoring, and prevention of entry into a no-fly area.

A terminal 108 of the receiving person of the package 14 is notified via the network 106 of information (e.g., receiving place, delivery schedule, storage space number, and password) required for collection. The terminal 108 is a portable terminal (including a tablet terminal or a smartphone), a personal computer, or the like to be operated by the receiving person.

Figure 6:
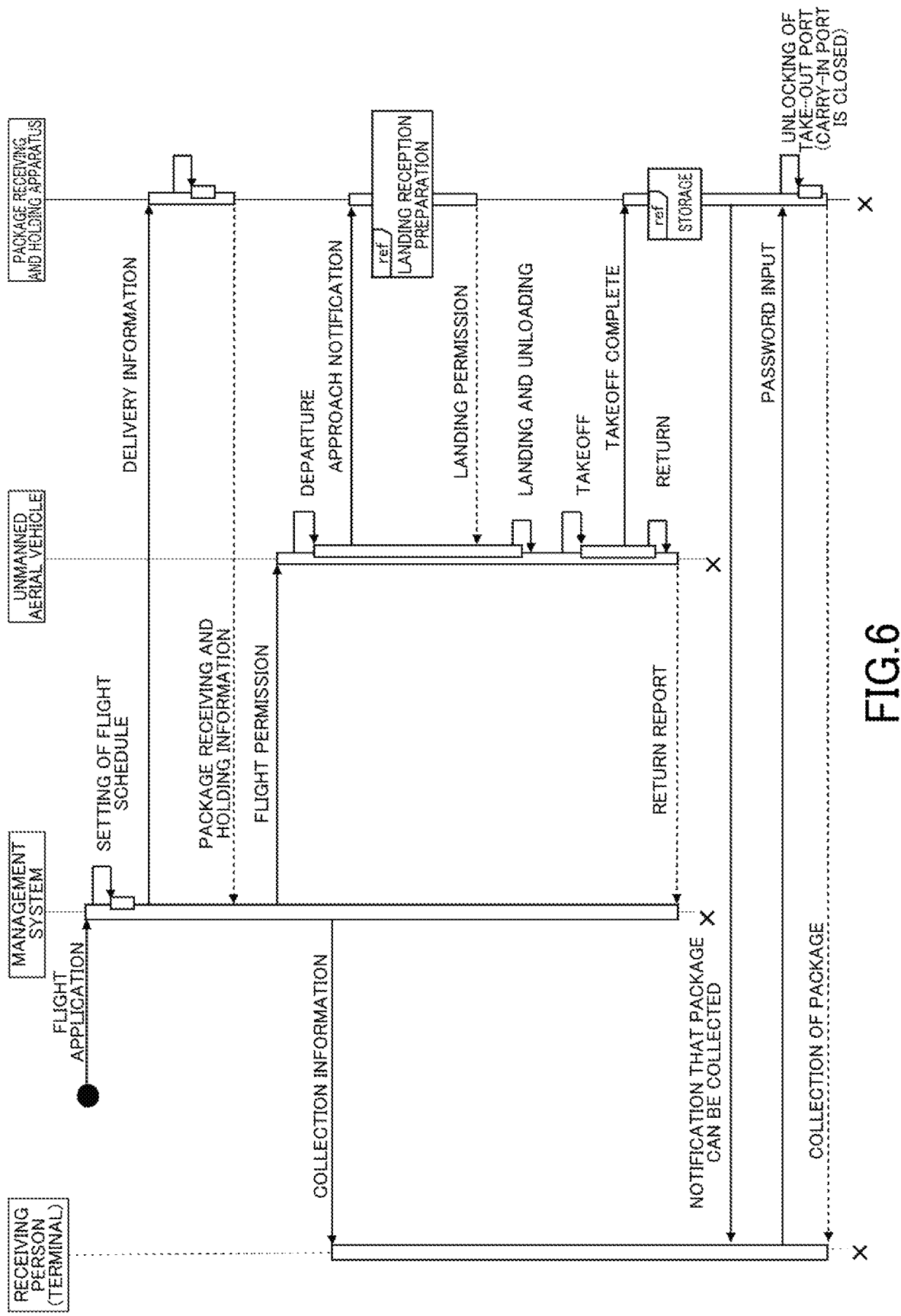
FIG. 6 is a sequence diagram for illustrating processing of the delivery system including the package receiving and holding apparatus.

FIG. 6 is a sequence diagram for illustrating processing of the delivery system including the package receiving and holding apparatus 10. The management system 102 is configured to receive a flight application and set a flight schedule. The flight application is issued from, for example, the operator of the unmanned aerial vehicle 12 (shipper of package 14). When the flight schedule is determined, delivery information is transmitted to the package receiving and holding apparatus 10. The delivery information includes information on the unmanned aerial vehicle 12 [e.g., aircraft identification code (ID) and delivery schedule] and information on the package 14 [package identification code (ID) and size].

[Package Receiving and Holding Schedule Setting]

A package receiving and holding schedule is set in the package receiving and holding apparatus 10. In the package receiving and holding apparatus 10, the processor 90 (calculation module 94) selects one of the plurality of storage spaces 36 based on information indicating which of the plurality of storage spaces 36 is available. The processor 90 (calculation module 94) selects one of the plurality of storage spaces 36 based on the information on the size of the plurality of storage spaces 36. When the package receiving and holding schedule has been determined, receiving and holding information is transmitted to the management system 102. The receiving and holding information includes a landing reception date and time, the selected storage space number, and a password.

When flight permission is received from the management system 102, the unmanned aerial vehicle 12 departs toward the package receiving and holding apparatus 10. When the unmanned aerial vehicle 12 flies uneventfully and approaches the package receiving and holding apparatus 10, the package receiving and holding apparatus 10 is notified of the approach of the unmanned aerial vehicle 12. Specifically, position information on the unmanned aerial vehicle 12 may be received by the package receiving and holding apparatus 10, and based on the received information, the processor 90 (calculation unit 94) may determine the approach of the unmanned aerial vehicle 12. When the unmanned aerial vehicle 12 approaches, the package receiving and holding apparatus 10 prepares for landing reception.

[Landing Reception Preparation]

Figure 7:
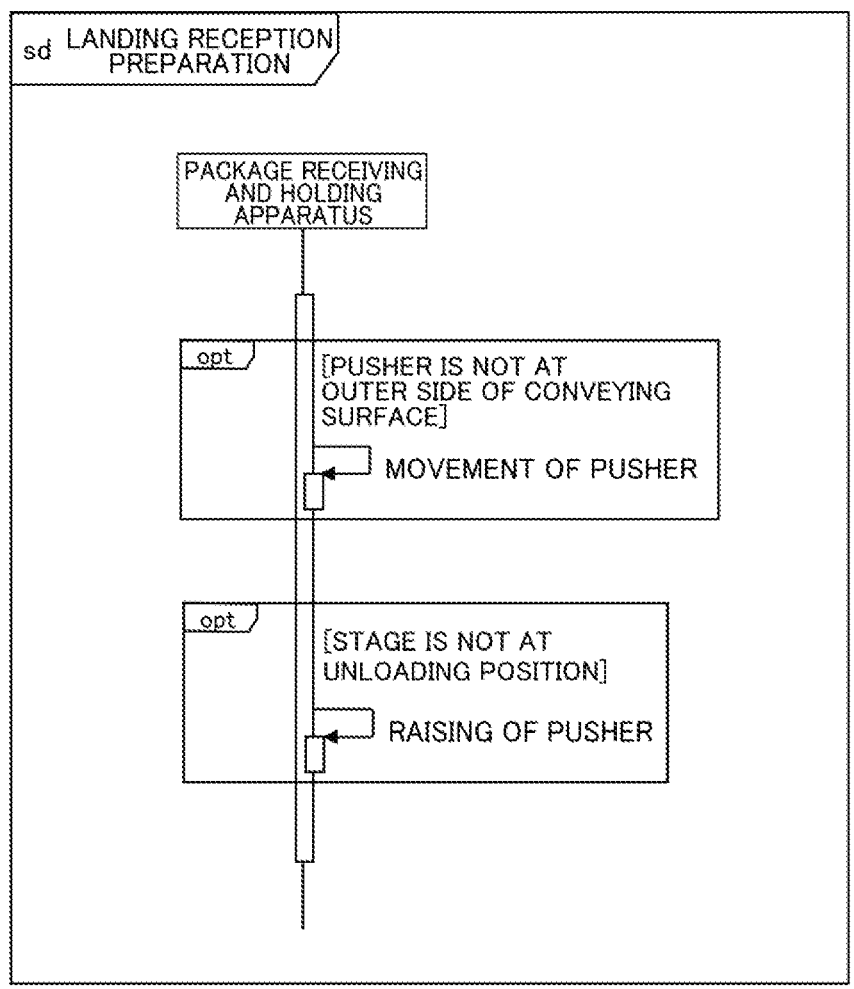
FIG. 7 is a sequence diagram for illustrating landing reception preparation processing.
Figure 8:
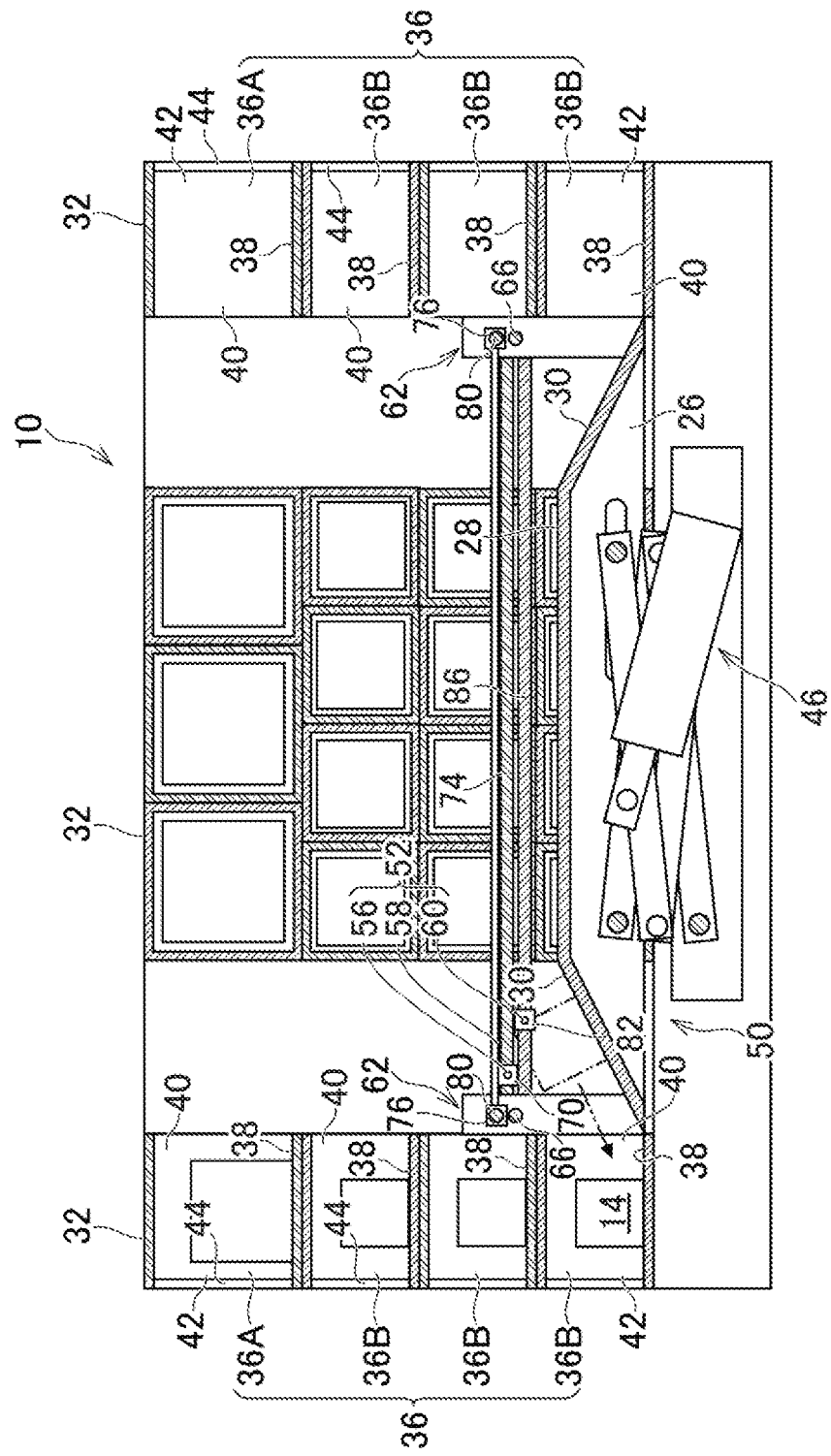
FIG. 8 is a diagram for illustrating storage of a package transported earlier.

FIG. 7 is a sequence diagram for illustrating landing reception preparation processing. FIG. 8 is a diagram for illustrating storage of a package 14 transported earlier.

At the point when the package 14 transported earlier is stored in the storage space 36, the pusher 52 is above the conveying surface 28. Therefore, the actuator 62 is controlled to move the pusher 52 to the outer side of the conveying surface 28 before the unloading of the next package 14 is started. For example, the first bar 54 and the third bar 58 are moved to the outer side of the conveying surface 28, and the second bar 56 and the fourth bar 60 are moved to the outer side of the conveying surface 28. Specifically, when the pusher 52 is not on the outer side of the conveying surface 28, the pusher 52 is moved in order to avoid impeding the landing of the next unmanned aerial vehicle 12.

At the point when the package 14 transported earlier is stored in the storage space 36, the stage 26 is at the storage position 50. Therefore, when the stage 26 is not at the unloading position 48 (FIG. 9), the stage 26 is raised. In this way, the lifter 46 is controlled so that the stage 26 at the storage position 50 is raised to the unloading position 48 before the unloading of the next package 14. This control is performed, at the latest, before the start of the unloading of the next package 14, and may be performed when the unmanned aerial vehicle 12 approaches (when approach is detected).

Figure 9:
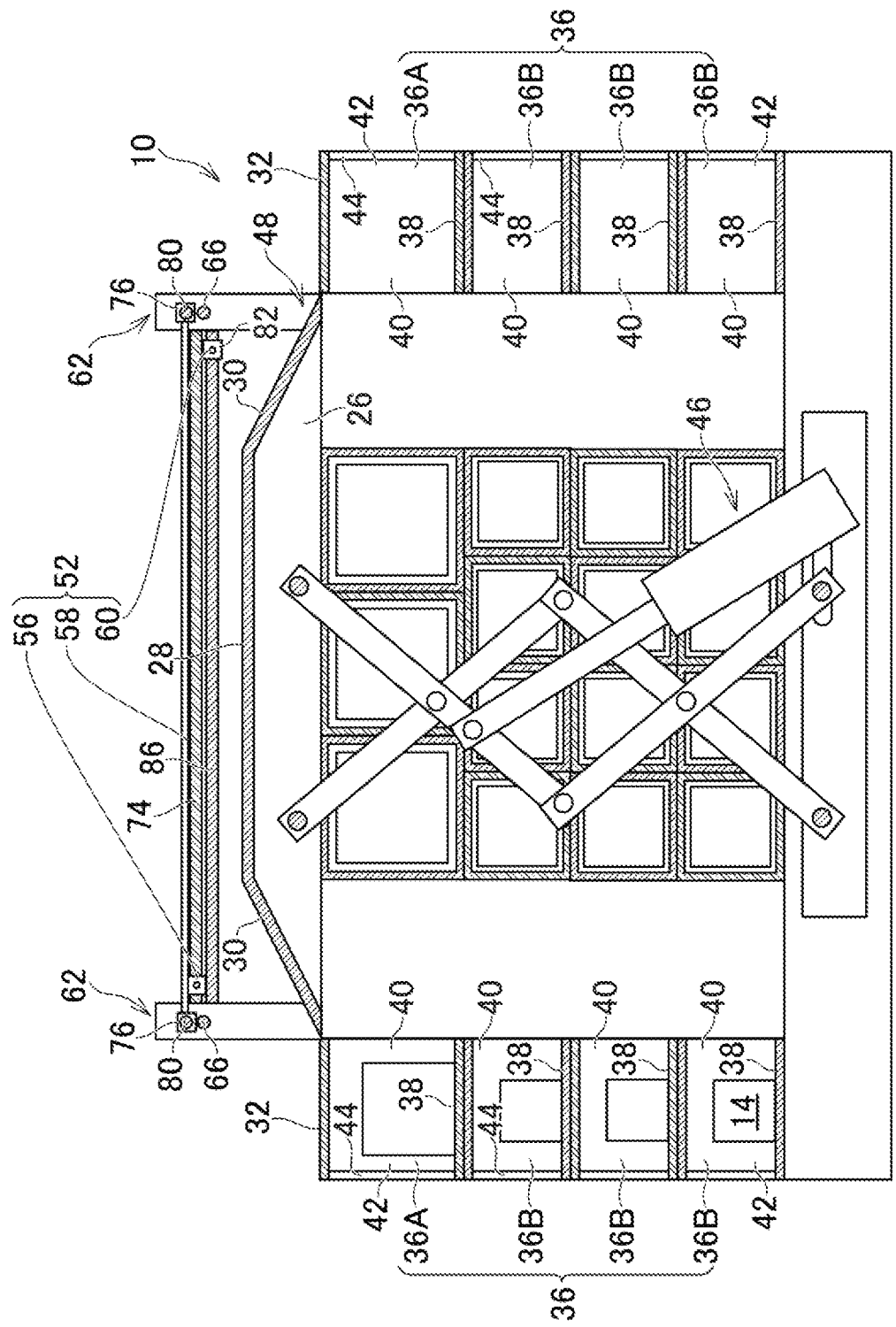
FIG. 9 is a diagram for illustrating a package receiving and holding apparatus for which landing reception preparation is complete.

FIG. 9 is a diagram for illustrating the package receiving and holding apparatus 10 for which landing reception preparation is complete. When landing reception preparation is complete, landing permission is notified from the package receiving and holding apparatus 10 to the unmanned aerial vehicle 12. This notification may be issued via the management system 102.

[Landing/Unloading/Takeoff]

When landing permission is received, the unmanned aerial vehicle 12 lands on the stage 26. The package 14 transported by the unmanned aerial vehicle 12 is unloaded onto the stage 26. The unmanned aerial vehicle 12 lands on the stage 26 (conveying surface 28), but it is not always required for the unmanned aerial vehicle 12 to contact the stage 26. During the unloading of the package 14, the first bar 54 and the third bar 58 are positioned on opposite sides to each other on the outer side of the conveying surface 28, and the second bar 56 and the fourth bar 60 are positioned on opposite side to each other on the outer side of the conveying surface 28.

The unmanned aerial vehicle 12 is controlled so as to land on the stage 26 and to take off after the unloading of the package 14 is complete. When the unmanned aerial vehicle 12 takes off and has moved to a safe position, the unmanned aerial vehicle 12 notifies the package receiving and holding apparatus 10 that takeoff has been completed.

[Storage]

Figure 10:
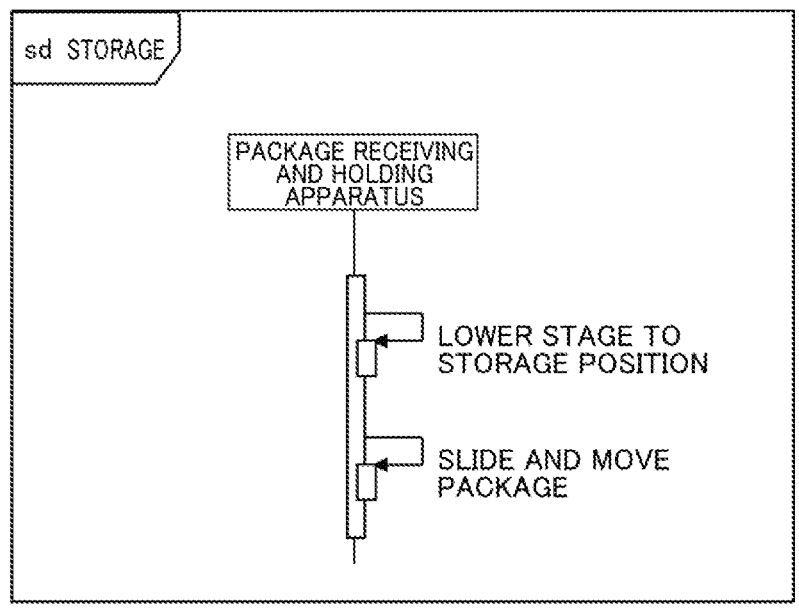
FIG. 10 is a sequence diagram for illustrating processing of storing a package.

FIG. 10 is a sequence diagram for illustrating processing of storing the package 14. As described above, the number of the storage space for storing the package 14 is stored in the memory 88 (FIG. 5), and the stage 26 is lowered to the corresponding storage position 50. Specifically, the stage 26 is lowered from the unloading position 48 of the package 14 to the storage position 50 by controlling the lifter 46.

Figure 11:
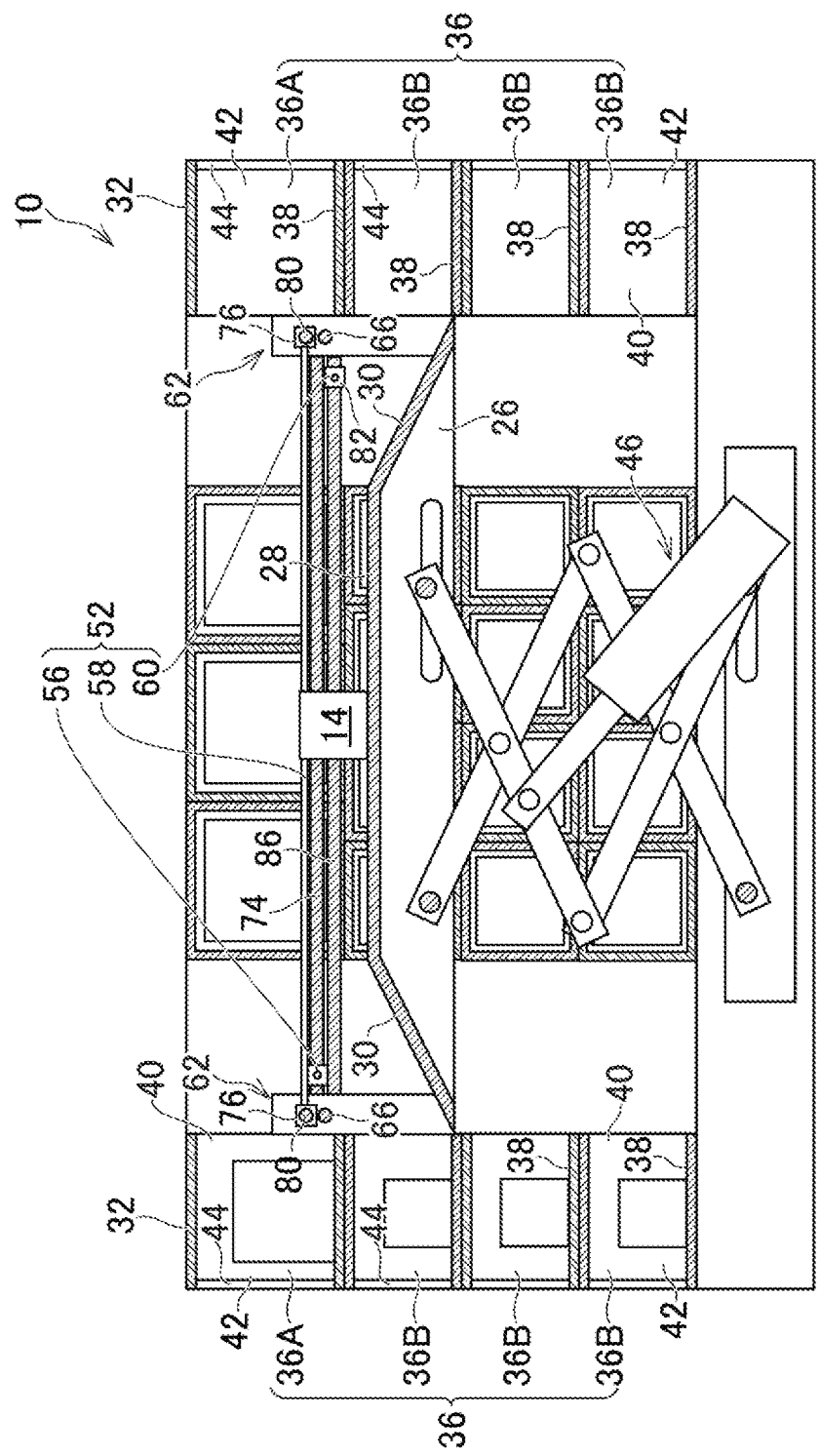
FIG. 11 is a diagram for illustrating a stage lowered to a storage position.

FIG. 11 is a diagram for illustrating the stage 26 lowered to the storage position 50. Next, the package 14 is slid and moved. The slide movement is performed by controlling the actuator 62. The control method is determined by the storage space 36, and the information on the control method is stored in the memory 88 in advance.

Figure 12:
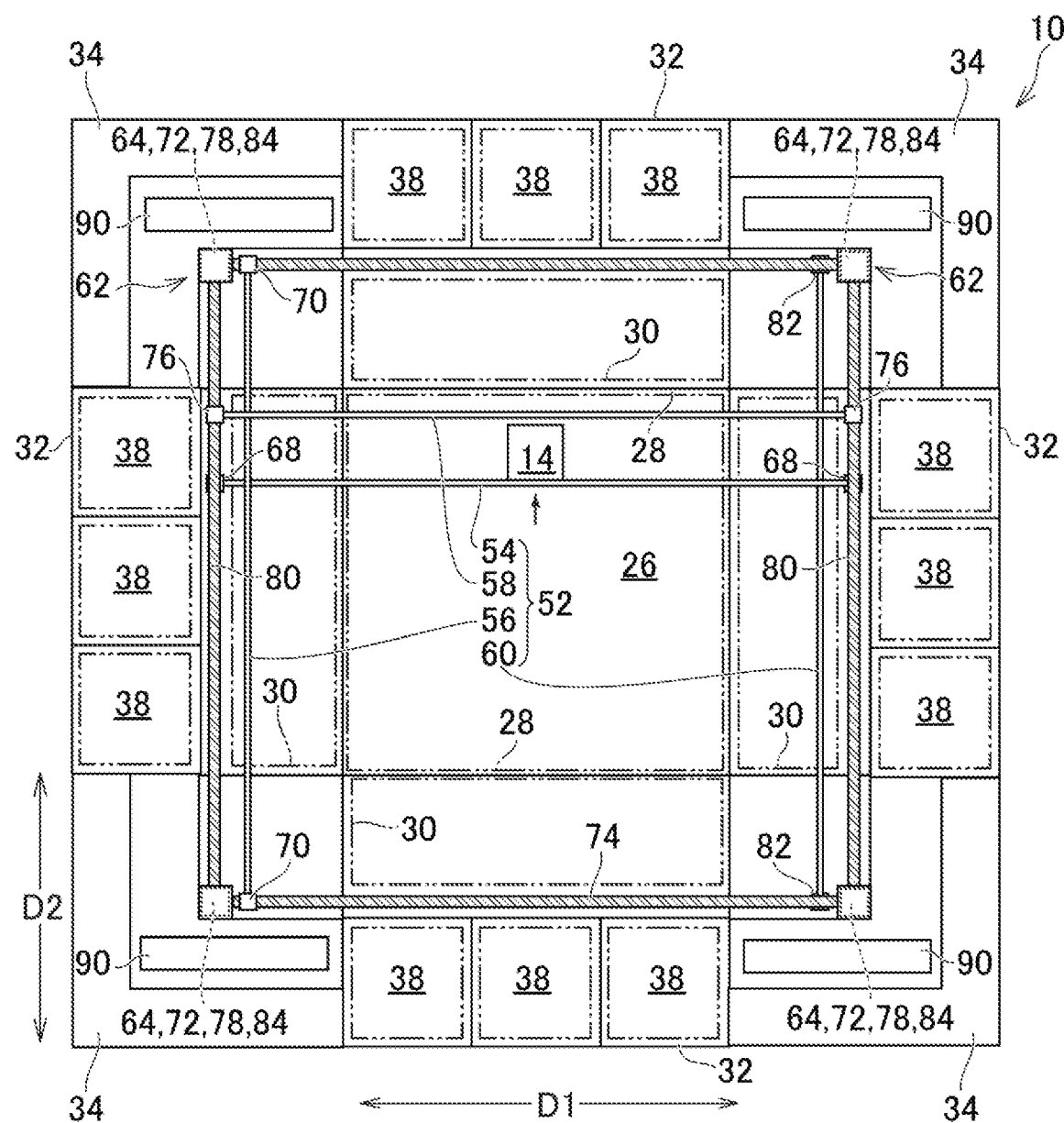
FIG. 12 is a diagram for illustrating an initial slide movement.

FIG. 12 is a diagram for illustrating an initial slide movement. Through control of the actuator 62, the pusher 52 is moved horizontally, which causes the package 14 to slide and move. This control is performed after the unloading of the package 14 is complete (after unmanned aerial vehicle 12 takes off), and hence the pusher 52 does not come into contact with the unmanned aerial vehicle 12.

The package 14 slides and moves to the selected storage space 36 by two-dimensional movement on the conveying surface 28. For this purpose, the unloaded package 14 is first slid and moved to a position facing the carry-in port 40 of the selected storage space 36.

In the example illustrated in FIG. 12, the first bar 54 and the third bar 58 are configured to move the package 14 along the second direction D2, and the first bar 54 positioned downstream of the package 14 in the movement direction is used. The third bar 58 is not used for the slide movement of the package 14, but the third bar 5 is used as a guide for guiding the package 14 to the storage space 36. The third bar 58 may prevent excessive slide movement and regulate the inclination of the package 14.

Figure 13:
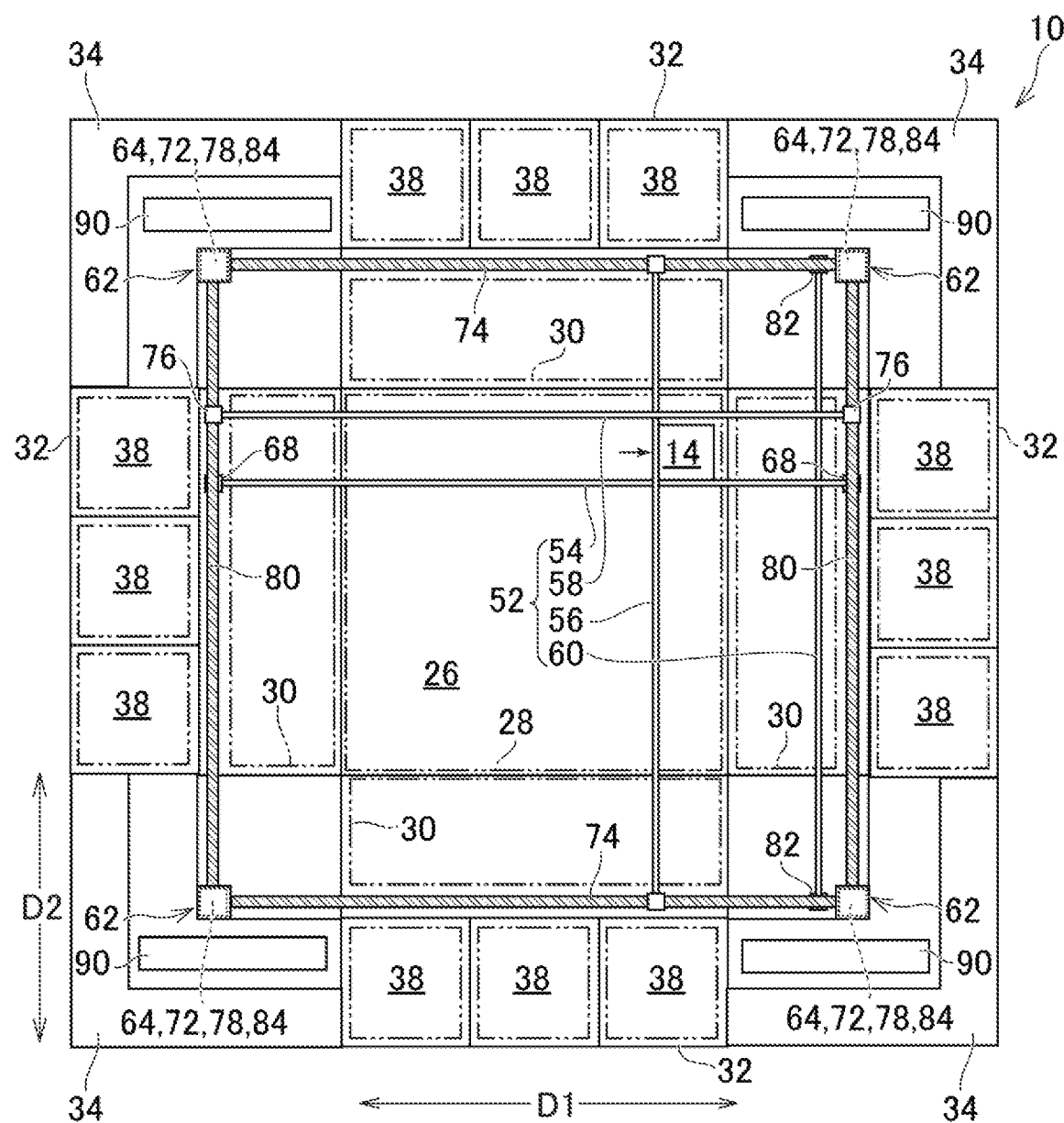
FIG. 13 is a diagram for illustrating the last slide movement.

FIG. 13 is a diagram for illustrating the last slide movement. The package 14 is caused to slide and move toward the carry-in port 40 of the selected storage space 36. Through control of the actuator 62, the pusher 52 (e.g., second bar 56) moves horizontally. The fourth bar 60 is not used, and hence the fourth bar 60 remains on the outer surface of the conveying surface 28.

Figure 14:
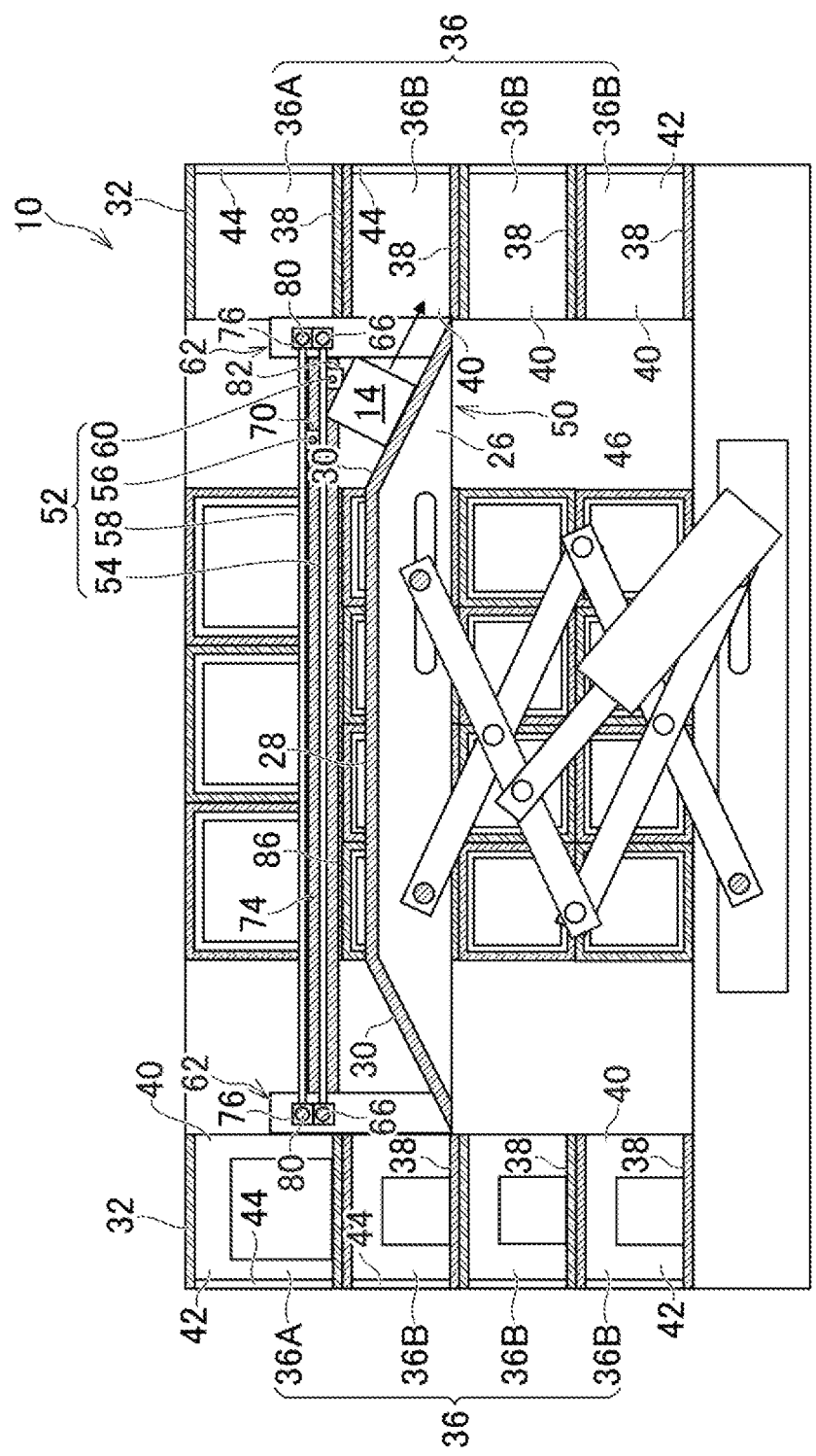
FIG. 14 is a diagram for illustrating a package entering a storage space.

FIG. 14 is a diagram for illustrating the package 14 entering the storage space 36. The package 14 that has been slid and moved by a horizontal movement of the pusher 52 enters the selected one of the plurality of storage spaces 36. The stage 26 has the inclined surface 30, and hence the package 14 moves under the fourth bar 60 that is not used. In this way, the package 14 is stored in the storage space 36. When the package 14 is stored, the take-out port 42 of the storage space 36 is controlled to be locked. For example, the door 44 is locked.

As illustrated in FIG. 6, when storage is complete, a notification that the package can be collected is transmitted to the receiving person (terminal 108). The receiving person unlocks the door 44 by electronic authentication, for example, input of a PIN number. In this way, security can be ensured. For example, the receiving person can unlock the take-out port 42 (door 44) by inputting the password to the package receiving and holding apparatus 10 (control panel 98). Then, the package 14 can be collected. When the take-out port 42 of the storage space 36 is unlocked, the corresponding carry-in port 40 may be closed. As a result, it is possible to prevent a person from entering or touching the stage 26 or another storage space 36 through the storage space 36.

According to this embodiment, the stage 26 is used in both unloading and slide movement of the package 14, and the package 14 can be held in a selected one of the plurality of storage spaces 36 by horizontally moving the pusher 52. Therefore, the plurality of packages 14 can be received and held by a simple mechanism.

The present invention is not limited to the embodiment described above, and various modifications may be made thereto. For example, the configuration described in the embodiment may be replaced by substantially the same configuration, a configuration having the same action and effect, and a configuration that may achieve the same object.

The invention claimed is:

1. A package receiving and holding apparatus, comprising:
   a stage for unloading a package transported by an unmanned aerial vehicle;
   a storage repository, which is arranged adjacent to the stage, and includes a plurality of storage spaces arranged at least in a vertical direction;
   a lifter for raising and lowering the stage;
   a pusher, which is movable in a manner so as to push the package on the stage; and
   an actuator for moving the pusher,
   the lifter being controlled so as to lower the stage from an unloading position of the package to a storage position corresponding to a selected one of the plurality of storage spaces,
   the actuator being controlled so as to move the pusher horizontally in order to slide and move the package toward the selected one of the plurality of storage spaces,
   wherein the pusher includes:
      a first bar extending along a first direction such that the package hits a side surface; and
      a second bar extending along a second direction intersecting the first direction such that the package htis a side surface; and
   wherein the actuator includes:
      a first slider configured to retain the first bar to be movable in a direction intersecting the first direction;
      a second slider configured to retain the second bar to be movable in a direction intersecting the second direction;
      a first motor configured to move the first slider; and
      a second motor configured to move the second slider.

2. The package receiving and holding apparatus according to claim 1, wherein the stage has a size that allows the unmanned aerial vehicle to take off and land.

3. The package receiving and holding apparatus according to claim 1, wherein the storage repository is horizontally arranged at a periphery of the stage.

4. The package receiving and holding apparatus according to claim 3, wherein the storage repository is arranged so as to surround the stage in a continuous manner.

5. The package receiving and holding apparatus according to claim 3, wherein each of the plurality of storage spaces includes:
   a carry-in port configured to be adjacent to an outer edge of the stage; and
   a take-out port on an opposite side to the carry-in port.

6. The package receiving and holding apparatus according to claim 5,
   wherein each of the plurality of storage spaces is physically separated from an adjacent storage space, and
   wherein the take-out port is lockable and unlockable.

7. The package receiving and holding apparatus according to claim 6, wherein the take-out port is controlled so as to be locked when the package is stored.

8. The package receiving and holding apparatus according to claim 6, wherein the take-out port includes a door that is openable and closable.

9. The package receiving and holding apparatus according to claim 1,
   wherein the stage includes a conveying surface for unloading and slide-moving the package,
   wherein each of the plurality of storage spaces includes a holding surface for holding the package,
   wherein the lifter is controlled such that when the package is slid and moved, the conveying surface is at a higher position than the holding surface, and
   wherein at least one of the storage repository and the stage includes an inclined surface descending in a direction from the conveying surface to the holding surface between the conveying surface and the holding surface.

10. The package receiving and holding apparatus according to claim 1,
    wherein the first slider is movable along the second direction, and
    wherein the second slider is movable along the first direction.

11. The package receiving and holding apparatus according to claim 1,
    wherein the pusher includes:
       a third bar extending along the first direction such that the package hits a side surface; and
       a fourth bar extending along the second direction such that the package hits a side surface, and
    wherein the actuator includes:
       a third slider configured to retain the third bar to be movable in a direction intersecting the first direction; and
       a fourth slider configured to retain the fourth bar to be movable in a direction intersecting the second direction.

12. The package receiving and holding apparatus according to claim 11,
    wherein the third slider is movable along the second direction, and
    wherein the fourth slider is movable along the first direction.

13. The package receiving and holding apparatus according to claim 11, wherein the actuator includes:
    a third motor for moving the third slider; and
    a fourth motor for moving the fourth slider.

14. The package receiving and holding apparatus according to claim 11, wherein the actuator is controlled such that during unloading of the package, the first bar and the third bar are positioned on opposite sides to each other at an outer side of the conveying surface and the second bar and the fourth bar are positioned on opposite sides to each other at an outer side of the conveying surface.

15. The package receiving and holding apparatus according to claim 14, wherein the actuator is controlled such that, before unloading of the package, the first bar and the third bar are moved to the outer side of the conveying surface and the second bar and the fourth bar are moved to the outer side of the conveying surface.

16. The package receiving and holding apparatus according to claim 15,
    wherein one of the first bar and the third bar and one of the second bar and the fourth bar are used to push the package, and
    wherein at least one of remaining bars other than the one of the first bar and the third bar and the one of the second bar and the fourth bar that are used to push the package is used as a guide for sliding and moving the package.

17. The package receiving and holding apparatus according to claim 1, wherein the lifter is controlled such that the stage is at the unloading position during unloading of the package.

18. The package receiving and holding apparatus according to claim 17, wherein the lifter is controlled so as to raise the stage at the storage position to the unloading position before unloading of the package.

19. The package receiving and holding apparatus according to claim 18, wherein the lifter is controlled so as to raise the stage to the unloading position when the unmanned aerial vehicle approaches.

20. The package receiving and holding apparatus according to claim 1, wherein the actuator is controlled so as to start the slide movement of the package after unloading of the package is complete.

21. The package receiving and holding apparatus according to claim 20,
wherein the unmanned aerial vehicle is controlled so as to land on the stage and to take off after unloading of the package is complete, and
wherein the actuator is controlled so as to start the slide movement of the package after the unmanned aerial vehicle takes off.

22. The package receiving and holding apparatus according to claim 1, further comprising a processor configured to control driving of the lifter and the actuator.

23. The package receiving and holding apparatus according to claim 22, wherein the processor is configured to select the one of the plurality of storage spaces based on information on which of the plurality of storage spaces is available.

24. The package receiving and holding apparatus according to claim 22,
wherein the plurality of storage spaces include storage spaces having different sizes, and
wherein the processor is configured to select the one of the plurality of storage spaces based on information on the size of each of the plurality of storage spaces.

25. A method of receiving and holding a package, the method comprising the steps of:
unloading a package transported by an unmanned aerial vehicle onto a stage;
controlling a lifter configured to raise and lower the stage such that the stage is lowered from an unloading position of the package to a storage position corresponding to a selected one of a plurality of storage spaces arranged adjacent to the stage at least in a vertical direction; and
controlling an actuator configured to move a pusher such that the package is pushed and slid and moved on the stage by a horizontal movement of the pusher toward the selected one of the plurality of storage spaces,
wherein the pusher includes;
a first bar extending along a first direction such that the package hits a side surface; and
a second bar extending along a second direction intersecting the first direction such that the package hits a side surface, and
wherein the actuator includes:
a first configured to retain the first bar to be movable in a direction intersecting the first direction;
a second slider configured to retain the second bar to be moveable in a direction intersecting the second direction;
a first motor configured to move the first slider; and
a second motor configured to move the second slider.

26. The method of receiving and holding a package according to claim 25,
wherein each of the plurality of storage spaces includes:
a carry-in port adjacent to an outer edge of the stage; and
a take-out port on an opposite side to the carry-in port, and
wherein the method further comprises a step of controlling the take-out port such that the take-out port is locked when the package is stored.

27. The method of receiving and holding a package according to claim 25, further comprising a step of controlling the lifter such that the lifter raises the stage at the storage position to the unloading position before the unloading of the package.

28. The method of receiving and holding a package according to claim 27, further comprising a step of controlling the lifter such that the lifter raises the stage to the unloading position when the unmanned aerial vehicle approaches.

29. The method of receiving and holding a package according to claim 25, further comprising a step of controlling the actuator such that the actuator starts the slide movement of the package after the unloading of the package is complete.

30. The method of receiving and holding a package according to claim 25,
wherein the unmanned aerial vehicle is controlled so as to land on the stage and to take off after the unloading of the package is complete, and
wherein the method further comprises a step of controlling the actuator such that the actuator starts the slide movement of the package after the unmanned aerial vehicle takes off.

31. A package receiving and holding apparatus, comprising:
a stage for unloading a package transported by an unmanned aerial vehicle;
a storage repository, which is arranged adjacent to the stage, and includes a plurality of storage spaces arranged at least in a vertical direction;
a lifter for raising and lowering the stage;
a pusher, which is movable in a manner so as to push the package on the stage; and
an actuator for moving the pusher,
the lifter being controlled so as to lower the stage from an unloading position of the package to a storage position corresponding to a selected one of the plurality of storage spaces,
the actuator being controlled so as to move the pusher horizontally in order to slide and move the package toward the selected one of the plurality of storage spaces,
wherein the pusher includes:
a first bar extending along a first direction such that the package hits a side surface;
a second bar extending along a second direction intersecting the first direction such that the package hits a side surface;
a third bar extending along the first direction such that the package hits a side surface; and a fourth bar extending along the second direction such that the package hits a side surface, and wherein the actuator includes:
- a first slider configured to retain the first bar to be movable in a direction intersecting the first direction;
- a second slider configured to retain the second bar to be movable in a direction intersecting the second direction,
- a third slider configured to retain the third bar to be movable in a direction intersecting the first direction;
- a fourth slider configured to retain the fourth bar to be movable in a direction intersecting the second direction;
- a third motor configured to move the third slider; and
- a fourth motor configured to move the fourth slider.

32. A method of receiving and holding a package, the method comprising the steps of:
- unloading a package transported by an unmanned aerial vehicle onto a stage;
- controlling a lifter configured to raise and lower the stage such that the stage is lowered from an unloading position of the package to a storage position corresponding to a selected one of a plurality of storage spaces arranged adjacent to the stage at least in a vertical direction; and
- controlling an actuator configured to move a pusher such that the package is pushed and slid and moved on the stage by a horizontal movement of the pusher toward the selected one of the plurality of storage spaces, wherein the pusher includes:
- a first bar extending along a first direction such that the package hits a side surface; and
- a second bar extending along a second direction intersecting the first direction such that the package hits a side surface;
- a third bar extending along the first direction such that the package hits a side surface; and
- a fourth bar extending along the second direction such that the package hits a side surface, and wherein the actuator includes:
- a first slider configured to retain the first bar to be movable in a direction intersecting the first direction;
- a second slider configured to retain the second bar to be movable in a direction intersecting the second direction;
- a third slider configured to retain the third bar to be movable in a direction intersecting the first direction;
- a fourth slider configured to retain the fourth bar to be movable in a direction intersecting the second direction;
- a third motor configured to move the third slider; and
- a fourth motor configured to move the fourth slider.

* * * * *